JAMES ASH.
Improvement in Tea Kettle Spouts.
No. 5,537. Reissued August 19, 1873.
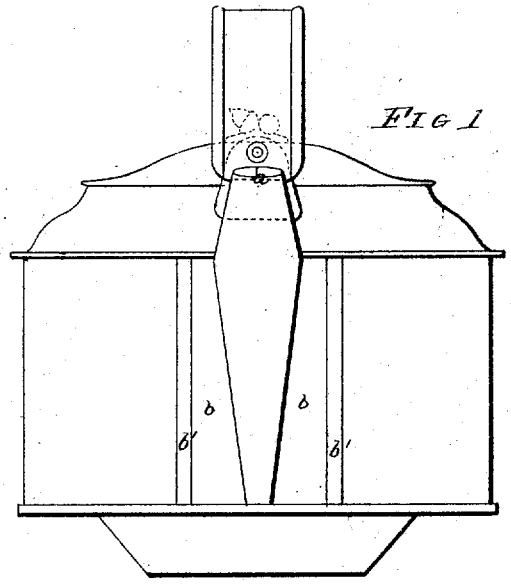
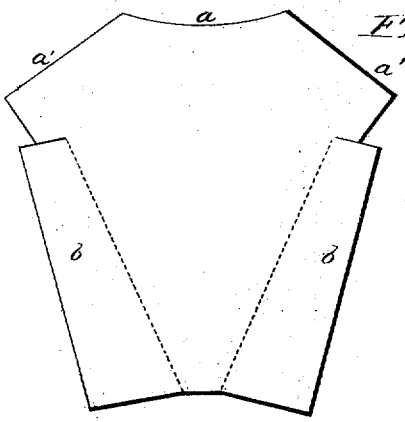
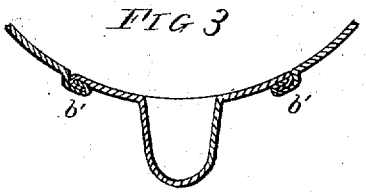
Witnesses.
Villette Anderson.
F. B. Curtis
Inventor.
James Ash
Chipman & Hamm & Co.
Attys.
AM. PHOTO-LITHOGRAPHIC CO. N.Y. (OSBORNE'S PROCESS)

UNITED STATES PATENT OFFICE.

JAMES ASH, OF STERLING, ILLINOIS.

IMPROVEMENT IN TEA-KETTLE SPOUTS.

Specification forming part of Letters Patent No. 123,215, dated January 30, 1872; reissue No. 5,537, dated August 19, 1873; application filed April 28, 1873.

*To all whom it may concern:*

Be it known that I, JAMES ASH, of Sterling, in the county of Whitesides and State of Illinois, have invented a new and useful Improvement in Tea-Kettle Spouts, of which the following is a full, clear, and exact description of the construction and operation of the same, which will enable others skilled in the art to which my invention appertains to construct and operate the same, reference being had to the accompanying drawing and to the letters and figures of reference marked thereon forming a part hereof, and in which—

Figure 1 is a front elevation of a tea-kettle provided with my improved spout. Fig. 2 is a front view of a sheet-metal blank shaped to form my improved spout, and Fig. 3 is a horizontal section of the spout attached to a kettle.

Like letters of reference indicate like parts.

My invention relates to tea-kettle spouts; and consists in making a kettle-spout blank of one piece of sheet metal, substantially as specified; and also in forming kettle-spouts from such blanks with a single seam, and in uniting such a spout to the body of a kettle by overlap-seams at a distance from the angle, so that the spout shall be as strong as the rest of the kettle.

In the drawing, Fig. 1, is shown my improved tea-kettle spout as applied to the body of a tea-kettle, and to form which I cut or stamp from any desired sheet metal a blank in the shape substantially as shown in Fig. 2, and consisting of the shoulders *a′ a′* and wings *b b*, and having an incision cut in the body of the blank at the junction of the said shoulders and wings, as shown. To form the spout from said blank the edges of the shoulders *a′* are brought together and soldered to form the seam, which extends along the back of the spout from its mouth, and the sides or wings *b* are then bent so as to correspond to the circumference of the kettle to which the spout is to be attached. The curved side *a* constitutes the edge of the mouth of the spout.

When the said spout is to be attached to the body of a kettle the ends of the strip or plate from which the body or cylindrical part of the kettle is formed are separated, so as to leave a space to be filled by the spout and the wings *b*. The wings are united to the body of the kettle by forming overlap-seams *b′* and soldering them. The upper and lower edges of the blank from which the spout is formed are fitted and soldered to the top and bottom of the kettle in the same manner as the rest of the kettle-body.

The spout constructed and arranged as described is as strong as, and even stronger than, the other parts of the kettle, and is believed to be better and more easily made than spouts which are soldered to the kettle at their angular junction. There is no danger of the spout breaking off, being stronger at the angles formed by the wings than at any other point.

The said improved kettle-spout blank, as such, or after being formed into a tea-kettle spout, as described, can be sold separate and distinct from the body of a tea-kettle, to be applied to, and used in the manufacture of, tea-kettles, and, as so applied, making a new and improved tea-kettle.

Having thus described the nature and object of my invention, what I claim as new, and desire to secure by Letters Patent, is—

1. A sheet-metal kettle-spout blank consisting of the shoulders *a′ a′* and wings *b b*, and having an incision cut in the body thereof at the junction of said shoulders and wings, substantially as shown and described.

2. A sheet-metal kettle-spout consisting of the shoulders *a′ a′*, united together as shown and described, and the wings *b b* formed to correspond to the circumference of the kettle, substantially as specified.

3. A sheet-metal kettle having its spout provided with wings *b*, bent outward from the angle, and secured to the body by seams along the outer edge of the wings, as specified.

JAMES ASH.

Witnesses:

JAS. DINSMOOR,

W. STAGER.